(12) United States Patent
Sadagopan et al.

(10) Patent No.: US 8,707,160 B2
(45) Date of Patent: Apr. 22, 2014

(54) SYSTEM AND METHOD FOR INFERRING USER INTEREST BASED ON ANALYSIS OF USER-GENERATED METADATA

(75) Inventors: Narayanan Sadagopan, Fremont, CA (US); Scott Holmes, Morgan Hill, CA (US)

(73) Assignee: Yahoo! Inc.

( * ) Notice: Subject to any disclaimer, the term of this patent is extended or adjusted under 35 U.S.C. 154(b) by 1632 days.

(21) Appl. No.: 11/502,869

(22) Filed: Aug. 10, 2006

(65) Prior Publication Data
US 2008/0040301 A1    Feb. 14, 2008

(51) Int. Cl.
*G06F 17/00* (2006.01)

(52) U.S. Cl.
USPC .................. 715/234; 707/999.006

(58) Field of Classification Search
USPC .......................................... 706/16
See application file for complete search history.

(56) References Cited

U.S. PATENT DOCUMENTS

| | | | | |
|---|---|---|---|---|
| 4,870,579 A * | 9/1989 | Hey | | 705/27 |
| 4,996,642 A * | 2/1991 | Hey | | 705/27 |
| 5,870,744 A * | 2/1999 | Sprague | | 707/9 |
| 6,340,977 B1* | 1/2002 | Lui et al. | | 715/709 |
| 6,681,247 B1* | 1/2004 | Payton | | 709/217 |
| 6,701,310 B1* | 3/2004 | Sugiura et al. | | 1/1 |
| 6,745,178 B1* | 6/2004 | Emens et al. | | 707/741 |
| 7,146,359 B2* | 12/2006 | Castellanos | | 1/1 |
| 7,603,352 B1* | 10/2009 | Vassallo et al. | | 1/1 |
| 7,647,306 B2* | 1/2010 | Rose et al. | | 707/999.003 |
| 2002/0002899 A1* | 1/2002 | Gjerdingen et al. | | 84/667 |
| 2002/0073079 A1* | 6/2002 | Terheggen | | 707/3 |
| 2005/0071328 A1* | 3/2005 | Lawrence | | 707/3 |
| 2005/0125382 A1* | 6/2005 | Karnawat et al. | | 707/3 |
| 2005/0210024 A1* | 9/2005 | Hurst-Hiller et al. | | 707/5 |
| 2005/0240608 A1* | 10/2005 | Jones et al. | | 707/101 |
| 2006/0242135 A1* | 10/2006 | Weare | | 707/4 |
| 2006/0242178 A1* | 10/2006 | Butterfield et al. | | 707/100 |
| 2006/0242554 A1* | 10/2006 | Gerace et al. | | 715/501.1 |
| 2006/0294094 A1* | 12/2006 | King et al. | | 707/6 |
| 2007/0011161 A1* | 1/2007 | Norton et al. | | 707/6 |
| 2007/0244888 A1* | 10/2007 | Chea et al. | | 707/6 |
| 2008/0071761 A1* | 3/2008 | Singh et al. | | 707/5 |

(Continued)

OTHER PUBLICATIONS

Infering User Interest Authors: Mark Claypool, David Brown, Phone Le, Lakoto Waseda Date: Dec. 2001.*

(Continued)

*Primary Examiner* — Laurie Ries
*Assistant Examiner* — Mustafa Amin
(74) *Attorney, Agent, or Firm* — Pillsbury Winthrop Shaw Pittman LLP

(57) ABSTRACT

User-generated tags from viewing web-based content are collected over a predetermined period of time. A subset of distinct or unique tags is identified from among the collected tags. A z-score is calculated for each identified distinct tag, where the z-score is a measure of the statistical significance of the tag. The subset of distinct tags is then sorted based on their corresponding z-score. All distinct tags having a corresponding z-score lower than a predetermined threshold are rejected and the remaining distinct tags, having a corresponding z-score higher than the threshold are used to infer a user's interest. The ability to infer a user's interests from the remaining distinct tags may thus benefit web-based applications by achieving a high degree of accuracy in predicting the interests of users by leveraging on the use of the user generated content tags and keywords.

25 Claims, 5 Drawing Sheets

(56) References Cited

U.S. PATENT DOCUMENTS

2008/0104172 A1* 5/2008 Craig .......................... 709/204
2008/0115068 A1* 5/2008 Smith .......................... 715/758
2008/0154896 A1* 6/2008 Sarathy et al. .................... 707/6
2010/0205541 A1* 8/2010 Rapaport et al. ............. 715/753

OTHER PUBLICATIONS

Information Presentation by Inferring User's Interests Based on Individual Conceptual Spaces Authors: Kaoru Sumi, Yasuyuki Sumi, Kenji Mase, Shin-ichi Nakasuka, Koichi Hori Date: Oct. 1999.*

Golder et al. "Usage Patterns of Collaborative taggins systems", Oct. 13, 2005, 11 pages, URL<http://pkudlib.org/qmeiCourse/files/Golder_usage_patterns_collaborative_tagging.pdf>.*

Ajita et al. "Collaborative Tagging and Expertise in the Enterprise", May 2006, 6 pages, URL<http://wwwiti.cs.uni-magdeburg.de/iti_db/lehre/Seminar%20Virtual%20Engineering/Paper/folksonomy2.pdf>.*

Bielenberg et al., "Groups in Social Software: Utilizing Tagging to Integrate Individual Contexts for Social Navigation", Aug. 15, 2005, pags 1-120, URL <http://users.cs.fiu.edu/~yzhan004/rectangularPacking/tagcloudRoud.pdf>.*

* cited by examiner

| | 502 | 504 | 506 | 508 |
|---|---|---|---|---|
| | TAGS | FREQUENCY | Z-SCORE | SIGNIFICANCE |
| | Surfing | 33 | 6.902122244 | Yes |
| | Recreation | 27 | 5.50620583 | Yes |
| | Snow | 23 | 3.825594887 | Yes |
| | Music | 21 | 3.210289416 | Yes |
| | Hiking | 17 | 1.979678473 | Yes |
| | References | 16 | 1.672025737 | Yes |
| $\alpha = 1.64 \longrightarrow$ | Cars | 15 | 1.364373002 | No |
| | Funny | 12 | 0.441414795 | No |
| | Webcams | 10 | -0.173890677 | No |
| | Misc | 10 | -0.173890677 | No |
| | Computers | 8 | -0.789196148 | No |
| | Driving | 7 | -1.096848884 | No |
| | Food | 7 | -1.096848881 | No |
| | Rock Climbing | 7 | -1.096848881 | No |
| | Games | 6 | -1.404501619 | No |
| | Biking | 5 | -1.712154355 | No |
| | News | 5 | -1.712154355 | No |
| | Corolla | 4 | -2.019807091 | No |
| | Science | 3 | -2.327459826 | No |
| | Shopping | 2 | -2.635112562 | No |
| | Travel | 2 | -2.635112562 | No |
| | Ucb | 2 | -2.635112562 | No |
| | Language | 1 | -2.94276398 | No |

FIG. 5

SYSTEM AND METHOD FOR INFERRING USER INTEREST BASED ON ANALYSIS OF USER-GENERATED METADATA

FIELD OF THE INVENTION

The invention relates generally to information processing and more particularly to methods and systems for inferring a user's interests from a set of tags or keywords a user assigns to web-based content.

BACKGROUND OF THE INVENTION

A specific goal for web content information management and retrieval technology is to provide users with an efficient way to acquire the content that they seek. One approach towards this goal is to provide users with a ranked list of references to particular pieces of web data that are deemed to be relevant to the topic of a user's request. As is well known to those of skill in the art, computer network search engines, such as YAHOO!® presently utilize this approach. Another approach towards this goal is to serve or feed data to the user that the user may be interested in, but has not specifically requested. An example of this approach is web based banner advertisements. For this approach to be effective, however, it is important to know what a particular user is interested in at a given time.

Present methods in use for inferring a user's interests without receiving explicit user input include, using a user's demographic information, when available, or using metadata, such as extracted keywords from content that the user is viewing or has viewed in the past. While demographic information provides a broad classification of what a user may be interested in, it can be insufficient as an information source of what is required for narrow targeting of content. The utilization of machine-selected metadata also suffers from certain drawbacks. Specifically, while machine generated metadata may prove useful for capturing what a user may be interested in at a particular time, this machine based generation of content metadata is limited in that it may not be representative of a user's true interests given that the metadata is selected by a source other than the user.

SUMMARY OF THE INVENTION

The present invention provides new and improved methods and systems for inferring a user's interests from user-generated metadata of web-based content (of which one example are tags). In the described embodiment, the invention provides systems and methods that leverage the assignment of tags or keywords to web-based content by users to solve the aforementioned problems and deficiencies of the prior art.

In accordance with one embodiment of the present invention, there are provided methods and systems for inferring a user's interests from user generated tags of web-based content, a method comprising: collecting a plurality of user-generated tags generated by the user while viewing web-based content over a predetermined period of time; identifying distinct tags from among the plurality of collected tags; calculating a corresponding z-score for each of the distinct tags, where the z-score is a measure of the statistical significance of the distinct tag; sorting the distinct tags based on the distinct tag's corresponding z-score; rejecting distinct tags that have z-scores lower than a threshold; retaining distinct tag's that have z-scores higher than or equal to the threshold; and using the retained distinct tag's to infer a user's interest where the retained distinct tags are tags that are representative of a user's true interests.

There have been provided new and improved methods and systems for inferring a user's interests from user-generated tags of web-based content. In accordance with the invention, user-generated tags from viewing web-based content are collected over a predetermined period of time. A subset of distinct or unique tags is identified from the collected tags. A z-score is calculated for each identified distinct tag. The z-score being a measure of the statistical significance of the tag. The subset of distinct tags is then sorted based on their corresponding z-score. All distinct tags having a corresponding z-score lower than a threshold are rejected. The remaining distinct tags, having a corresponding z-score higher than the threshold are used to infer a user's interest. The invention thus may be implemented to benefit web-based applications by achieving a high degree of accuracy in predicting the interests of user by leveraging on the use of user generated tags in the form of content tags or keywords, as input to a process for classifying unstructured web-based content that the user is viewing or has viewed in the past.

Based on the foregoing, it is recognized that the invention provides numerous advantages over the prior art including providing a high degree of accuracy in predicting the interests of a user by using data, generated by the user, in the form of content tags or keywords to classify unstructured web-based content that the user is viewing or has viewed in the past. Having knowledge of user provided content tags that are determined to have a statistical relevance exceeding mere random choice, facilitates the creation of a narrow profile for what a given user's interests are. This profile can be used to increase the efficiency of serving unsolicited content to users. This increase in efficiency can be realized in increased advertising revenues and increased user satisfaction, and thus, increased numbers of page views, increased click through rates, increased average visit time, and decreased abandonment rates.

BRIEF DESCRIPTION OF THE DRAWINGS

These and other objects, features and advantages of the present invention will become apparent through consideration of the Detailed Description of the Invention, when considered in conjunction with the drawing Figures, in which:

FIG. 5 is a table illustrating a list of distinct tags ranked in accordance with their corresponding z-score values, which, according to one embodiment of the invention, may be generated by the process of FIG. 4.

DETAILED DESCRIPTION OF THE EXEMPLARY EMBODIMENTS

The present invention will now be described in detail with reference to the drawings, which are provided as illustrative examples of the invention so as to enable those skilled in the relevant art(s) to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, throughout this description, if an item is described as implemented in software, it can equally well be implemented as hardware or a combination of both hardware and software. It is also understood that "data," as used herein, is either singular or plural, as the context requires. It should be appreciated that computer code for implementing aspects of the present invention in software can be C, C++, HTML, XML, Java, JavaScript, etc. code, or any suitable scripting language (e.g., VBScript), or any other suitable programming language.

There is provided herein new and improved processes and system for use in information management and retrieval including web based information management and retrieval. The invention is described herein with respect to web-based content and the Internet. However, the reader will appreciate that the invention is not limited to web-based content and the Internet, but is equally applicable to other content and networks.

Figure 1:
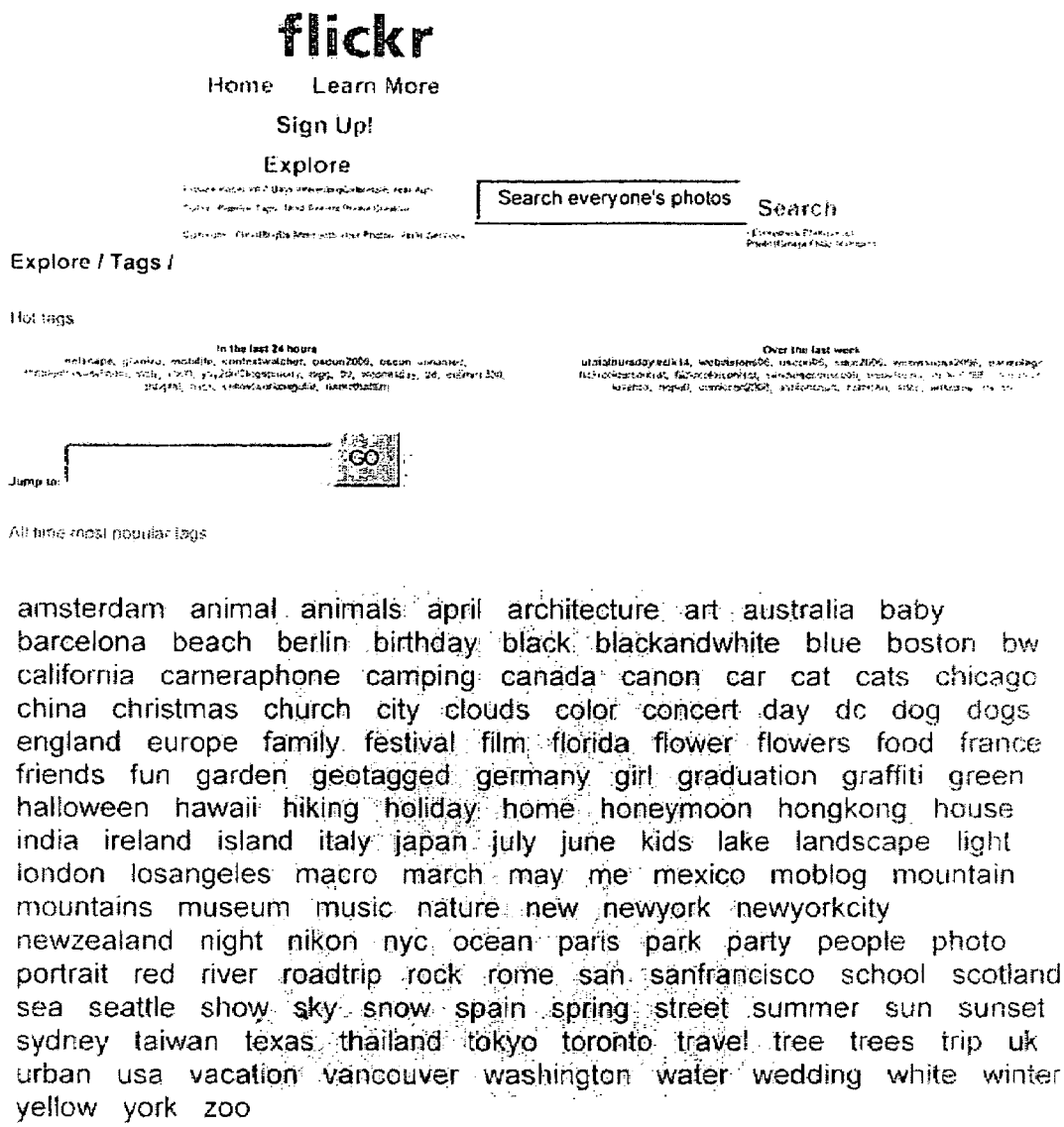
FIG. 1 is a web page showing the set of popular tags selected by users at a content tagging website, according to the prior art.

With reference now to FIG. 1, there is shown and described an exemplary web page for illustrating typical terms used to perform content tagging, in accordance with the prior art. Specifically, FIG. 1 is a set of popular tags generated by users at a popular digital photo sharing website and web services suite, FLICKR™ that provides users with a capability for tagging on-line content. FLICKR™ is one example of a social software oriented site that allows for easy tagging of digital content. An easy and convenient way of exploring a FLICKR™ photograph database is by navigating among related tags, which users attach to photos. Other representative social software websites that provides content tagging services include MYWEB™, YAHOO360, and DEL.I-CIO.US™.

Content tagging empowers users of such websites to add their own contextual tags to website content. Typically, this results in categorization of content in a way that is relevant to the needs of the users. Content tagging generally operates by adding keywords and other user-generated metadata (or 'tags') to a web-based document to achieve two essential purposes. First, the added keywords identify a user's interests and secondly, the added keywords capture the meaning of particular content. A user is free to choose any tags of his or her choosing and there is no limitation on the number of tags that may be assigned to a document.

Figure 2:
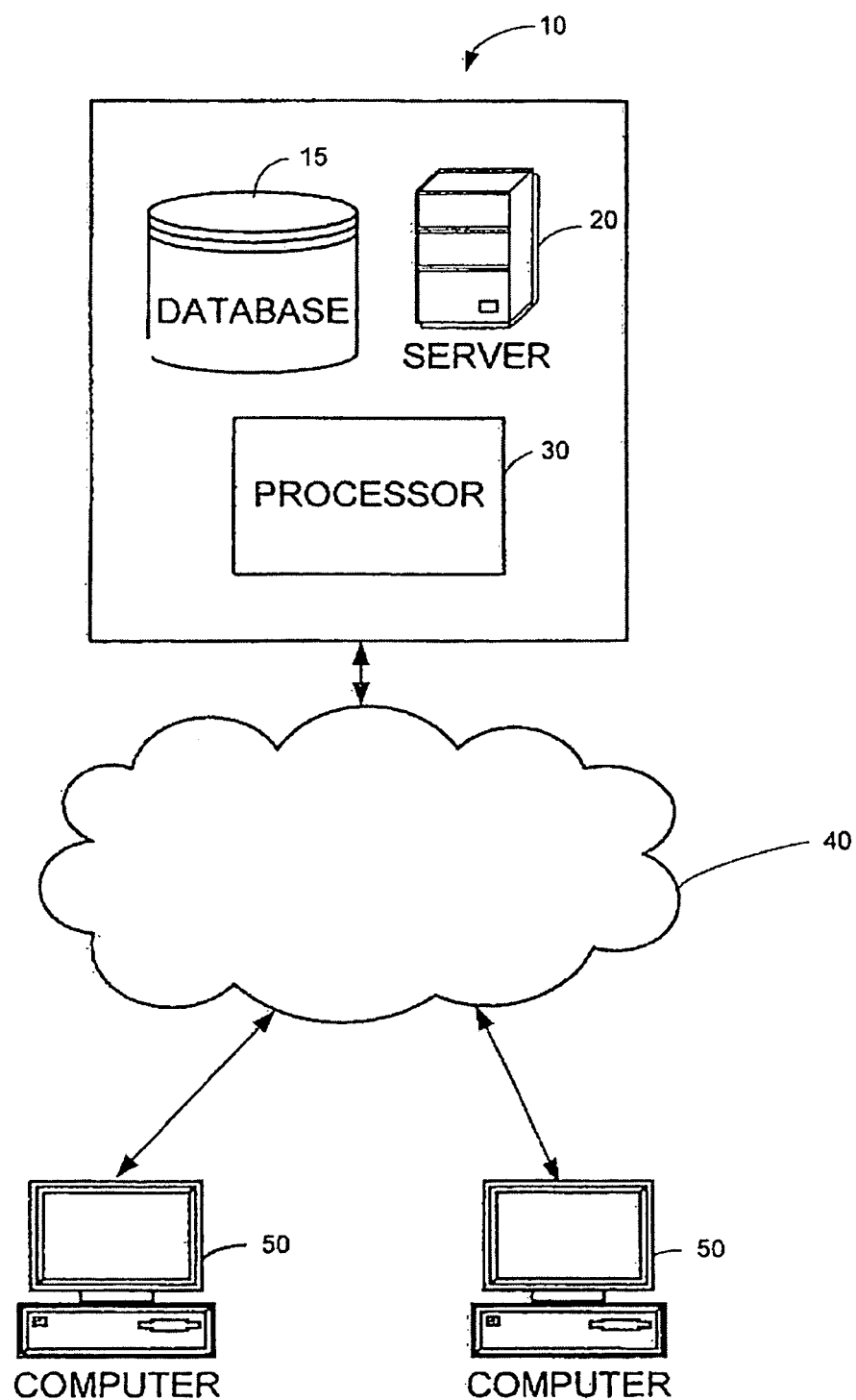
FIG. 2 is a system level diagram showing the interconnectivity of one or more aspects of the invention, according to one embodiment of the invention.

Referring now to FIG. 2, there is shown one embodiment of a computer system 10 for inferring a user's interests from user generated tags of web-based content may include one or more of the following: a database 15, server 20, and processor 30. The database 15 may be one or more storage devices, suitable for storing data described herein. The database 15 may be, for example, an Oracle 8.x Database Management System. The server 20 can be any component that is capable of running and supporting software to carryout the modules and functionality described herein, such as an SQL server. The processor 30 can be any component that is capable of processing data and information to provide the functionality as described herein, which may be included in one or more of the servers 20 or may be part of a separate computer.

In one embodiment, the system 10 is communicatively coupled over a network 40 to client computers 50. The network 40 can be a local area network (LAN), wide area network (WAN), Internet, or any other network capable of communicating information and data from the system 10 to client computers 50, which may be local or remote. The system 10 may be accessed by a plurality of computers 50, each of which can be any computer device known in the art, for example, a personal computer including components such as a memory device, an input component, such as a keyboard and mouse, a display, and a central processing unit. The computer 50 may also be a laptop, personal digital assistant (PDA), handheld device, such as a mobile telephone or BlackBerry™ or other device capable of receiving data and sending the data over network 40 to the system 10. In general, the client computers 50 have a web browser for receiving and viewing documents written in the Hypertext Markup Language (HTML) and transmitted over the network 40 via Hypertext Transfer Protocol (HTTP) and transmitting requests for HTML documents to the system 10 via HTTP, or any other software for displaying interfaces with information provided from a remote computer, such as server 20.

Figure 3:
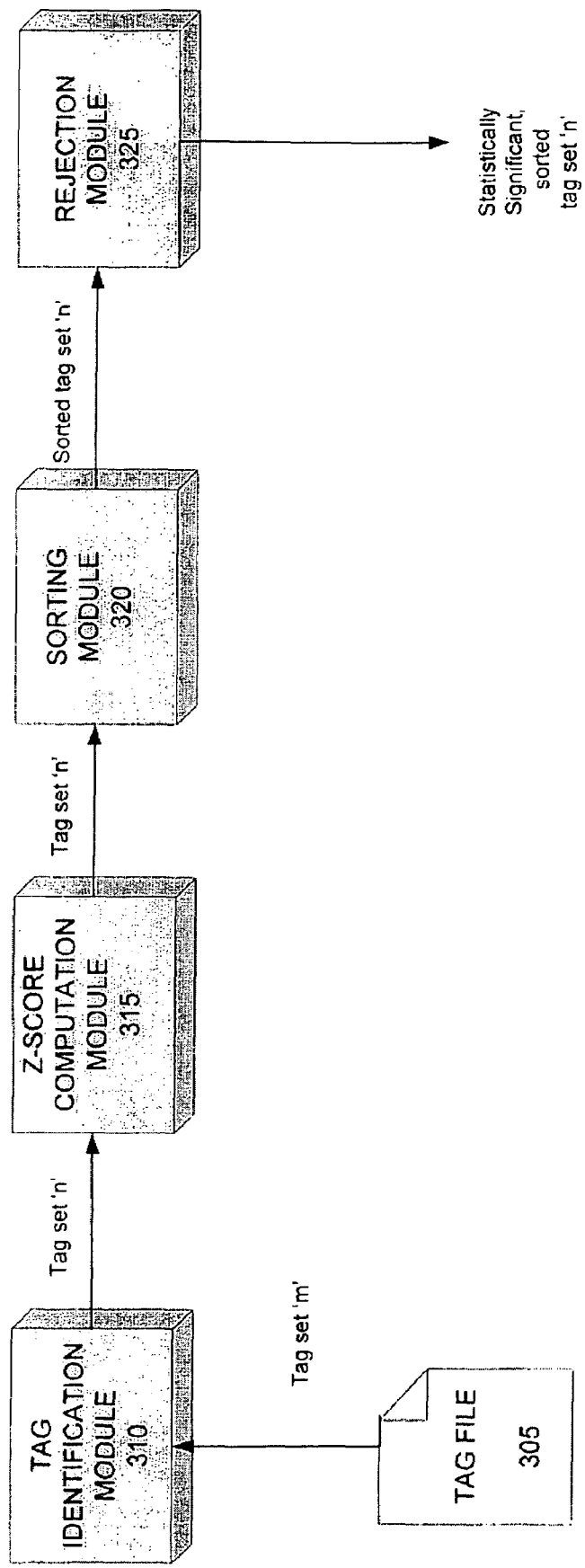
FIG. 3 is an exemplary software block diagram of an embodiment of the software modules made available by the system of FIG. 2, according to one embodiment of the invention.

FIG. 3 is an exemplary software block diagram of an embodiment of the software modules made available by the system 10. The software modules may include a tag file 305, stored in database 15, a tag identification module 310 having an input coupled to an output of the tag file 305, a z-score computing module 315 having an input coupled to an output of the tag identification module 310, a sorting module 320 having an input coupled to an output of the z-score computing module 315, and a rejection module 325 having an input coupled to an output of the sorting module 320.

In operation, the tag file 305 supplies a set 'm' of user generated tags, collected over a predetermined time period, as input to the tag identification module. The tag identification 310 is configured to identify distinct tags from among the tags included in the tag file 305. The tag identification module 310 outputs a set of distinct tags, 'n', as input to the z-score computing module 315. The z-score computing module 315 is configured to calculate z-scores for a given tag output from the tag identification module 310. The set of sorted or ranked tags 'n', output from the z-scoring module, is supplied as input to the rejection module 325 which is configured to reject those tags that have z-scores lower than a threshold, which may be a predetermined threshold. The rejection module outputs the tags whose z-score is at least equal to or greater than the threshold. This set of tags is referred to as the set of statistically significant distinct tags 330.

Figure 4:
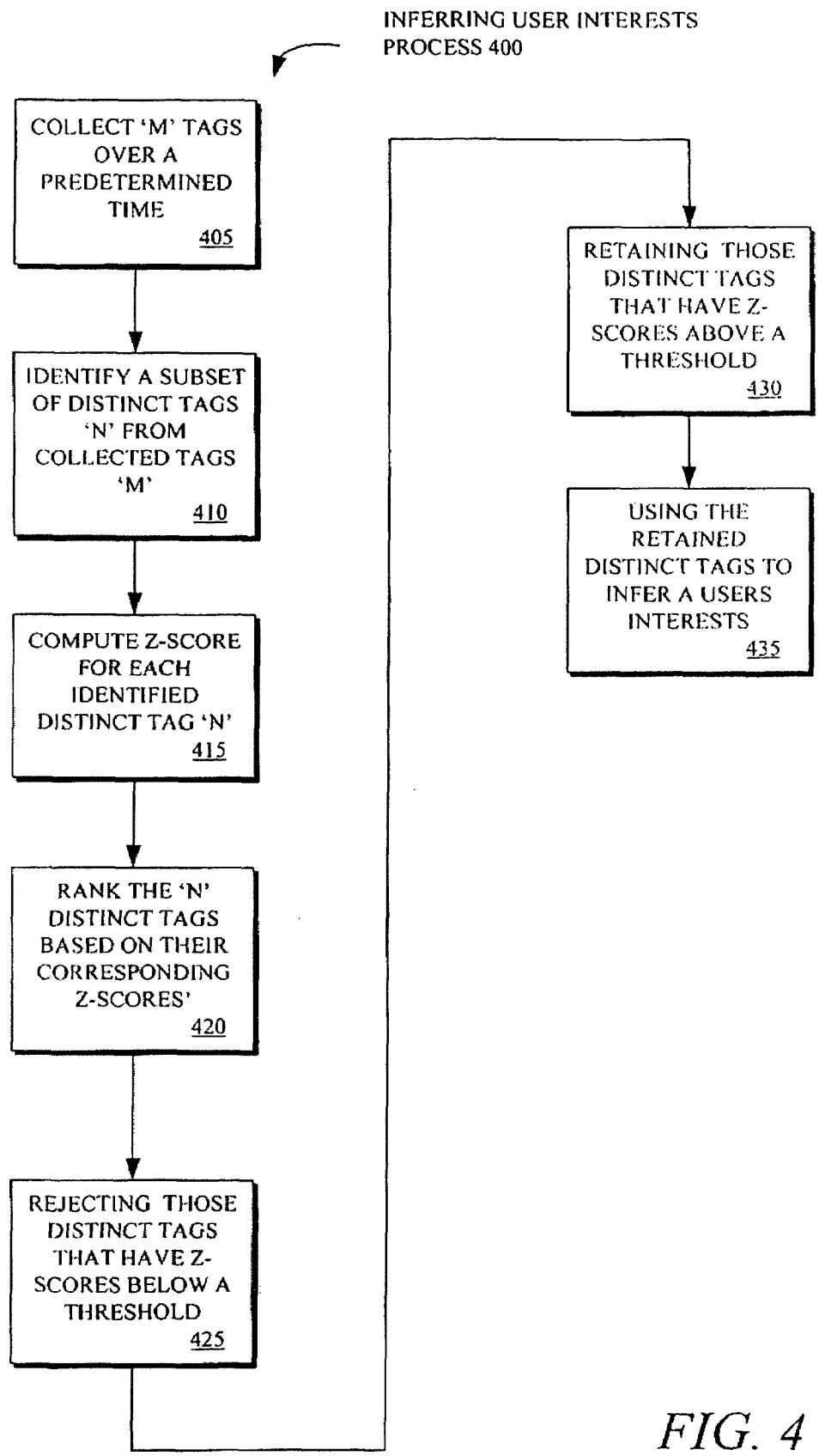
FIG. 4 is a flow chart showing the details of a process for inferring user interests from a set or subset of tags the user assigns to web-based content, according to one embodiment of the invention.

FIG. 4 depicts an embodiment of a process 400 for inferring user interests from a set or sample of tags the user gives to web-based content.

Process 400 begins at block 405 whereupon the process 400 collects the total number of tags 'm' that a given user provides over a time period, which may be a predetermined time period. It is appreciated that the time window is a configurable parameter that may change. For example, a seasonal time period may be used to infer seasonal interests The process 400 then identifies at block 410, a subset of distinct tags 'n' from among the total number of collected tags 'm'.

The process 400 then moves to block 415 where a z-score is computed for each identified distinct tag 'n' at block 410. The z-score is a measure of the observed frequency, freq (i), of a given identified distinct tag 'i'. As will be described below, the process uses the z-score to compare the observed frequency against a hypothetical frequency in which a user tags web content at random. In the present embodiment, the z-score for a given tag may be computed as follows:

$$z(i) = [freq(i) - \mu]/\sigma \quad (1)$$

The term freq (i) in equation (1) represents the observed frequency of occurrence of each distinct tag 'i' provided by a user over a predetermined time period. For example, it may be observed that a user provides a "surfing" tag to web-based content a total of 33 times over a period of one year. In this case, freq (i)=33 for the distinct 'surfing' tag.

The process, according to the present embodiment, compares an observed frequency of occurrence, freq(i), of a user tagging web content against a hypothetical frequency of occurrence in which a user tags web content at random. This difference is exploited by the present invention to identify those tags that infer a user's interests as opposed to other tags that merely reflect random choice by a user. The z-score, in combination with a threshold $\alpha$, provides a quantitative means for identifying those tags that infer a user's interests. In general, random tagging behavior, in the context of the invention, may be defined as behavior in which a user provides a total of m tags and n distinct tags and uses the n distinct tags with equal probability of 1/n, independent of every other distinct tag i.

It is well known, to those knowledgeable in the statistical arts, that in random tagging behavior, the number of occurrences X of each distinct tag i has a Gaussian distribution with a mean and standard deviation, calculated as follows:

$$\mu = m/n \quad (2)$$

and $$\sigma = \text{sqrt}(m/n) \quad (3)$$

These two values are incorporated into equation (1) to derive a z-score for each identified distinct tag 'i' which provides a statistical measure of the tag's statistical significance in predicting or inferring a user's interests.

At block 420, the 'i' distinct tags are ranked in accordance with their respective z-score values. This is illustrated, by way of example, in the table 500 of FIG. 5. The table 500 is comprised of 4 columns. In the first column 502, there is shown a number of distinct tags 'n' that are identified by the system from among a set of total tags 'm' provided by a user over a predetermined time period. In the second column 504, there is shown a corresponding frequency of occurrence, or usage, for each tag in the set of distinct tags 'n', over the predetermined time period. In the third column 506, there is shown each tag's corresponding computed z-score value, computed in accordance with equation (1) above. In the fourth column 508 there is shown an indication of the tag's statistical significance, as determined by the z-score for a given tag exceeding a threshold criteria, e.g., $\alpha$=1.64 (see FIG. 5, label 510). The statistical significance is described more fully at block 425, as follows.

At block 425, a determination is made regarding the statistical significance of each of unique or distinct tag 'i'. In the present embodiment, this determination is made using a threshold criteria $\alpha$. Distinct or unique tags having a computed z-score, z(i), greater than the threshold criteria $\alpha$ are considered to be statistically significant in the sense that the tags statistical significance exceeds mere random choice by a user. In other words, the computed z-scores provide an indication that the user is more biased towards, or has an interest in, these distinct tags 'n' than mere random chance.

In the present embodiment, the threshold a is determined on the basis of a desired statistical confidence for identifying tags that are true representations of a user's interests. For example, for a 95% statistical confidence, $\alpha$=1.64 and for a 99% statistical confidence, $\alpha$=2.33. The $\alpha$ value can be chosen based on the statistical confidence desired. According to one embodiment, the alpha values may be looked up from a standard statistical table for "Areas of a Standard Normal Distribution" for a given confidence level (which may be determined by the user or a software process).

It should also be appreciated that the process of FIG. 4 is illustrative and that variations and modifications are possible.

It is appreciated that the process may consider different start and end times over which the total number of tags 'm' is provided by a typical user. Further, the predetermined time may be continuous or non-continuous to predict seasonal or short-term interests of users.

In accordance with one optional embodiment of the present invention, the determination of distinct tags that are representative of a user's true interests, may be improved by editing (pre-processing) the user provided collection of tags 'm' to correct for misspellings, synonyms and for removing commonly used words such as, 'the' and 'howto', for example. In such an embodiment, a pre-processing module may be utilized to operate on the collection of user provided tags 'm' and provide, as output, an edited set of tags 'm'.

In accordance with one optional embodiment of the present invention, for those tags determined to be statistically significant, a post processing module may be utilized in the system 10 to further classify the statistically significant tags into broader categories to generalize the user tags. For example, a tag such as "c++" or "java" may be generalized to a tag having a broader context, such as "programming" by leveraging knowledge of the tag labels to provide more useful results.

In accordance with one optional embodiment of the present invention, it is contemplated to provide a means for comparing tags from two or more users. The comparison may take any number of forms including, for example, comparing the statistically significant tags from each user based on one or more criteria, including, without limitation, the quantity of statistically significant tags, a difference in the z-scores, etc. It should be noted that the two or more users may comprise a social network, and the techniques of the embodiments of the present invention are applicable to sets of tags from social networking sites such as FLICKR™, DEL.ICIO.US™, and other social networking sites know to those of skill in the art.

While the embodiments described herein may make reference to web sites, links, and other terminology specific to instances where the World Wide Web (or a subset thereof) serves as the search corpus, it should be understood that the systems and processes described herein can be adapted for use with a different search corpus (such as an electronic database or document repository) and that results may include content as well as links or references to locations where content may be found. Clickable buttons and other user interface control elements referred to herein may be replaced by any suitable alternative elements.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method operable on a computer for inferring a user's interests from user generated tags, the method comprising:
    collecting a plurality of user-generated tags from a given user and one or more users in a social network of the given user over a predetermined period of time;
    electronically, calculating, via a processing device, a corresponding z-score for each of the plurality of user-generated tags, where the corresponding z-score is a measure of a statistical significance for a given tag based on an observed frequency of the given tag being selected and a tag selection frequency distribution over the plurality of user-generated tags for the predetermined period of time;
    retaining one or more tags from the plurality of user-generated tags where the corresponding z-score of the one or more tags is higher than a threshold determined based on random tag selection by the given user and the one or more users in the social network of the given user based on the tag selection frequency distribution;
    comparing the retained one or more tags of the given user with the retained one or more tags of the one or more users in the social network of the given user; and
    inferring the given user's interest based on the comparison of the retained one or more tags of the given user and the retained one or more tags of the one or more users in the social network of the given user.

2. The method of claim 1, further comprising the step of sorting the plurality of user generated tags based on the plurality of user generated tags' corresponding z-score.

3. The method of claim 1, wherein the threshold has an associated confidence value that is determined on the basis of a desired statistical confidence for inferring the given user's interests.

4. The method of claim 1, wherein the collecting step collects the plurality of user generated tags from one or more web-based content.

5. The method of claim 1, wherein the predetermined time period is a configurable parameter.

6. The method of claim 1, wherein the predetermined time period is a continuous time period.

7. The method of claim 1, wherein the predetermined time period is a non-continuous time period.

8. The method of claim 1, wherein the step of calculating the corresponding z-score for the given tag, z(i), comprises calculating a z-score as:

$$z(i)=[\text{freq}(i)-\mu]/\sigma$$

where freq (i)= a frequency of occurrence of the given tag;
$\mu$= a mean of the number of occurrences of distinct tags;
$\sigma$= a standard deviation of the number of occurrences of distinct tags.

9. A non-transitory computer-readable medium having computer executable instructions for performing the method of claim 1.

10. A system for inferring a user's interests from user generated tags, the system comprising:
    a processor;
    a memory connected to the processor and storing instructions for operating the processor to perform steps of:
        collecting a plurality of user-generated tags from a given user and one or more users in a social network of the given user over a predetermined period of time;
        calculating a corresponding z-score for each of the plurality of user-generated tags, where the corresponding z-score is a measure of a statistical significance for a given tag based on an observed frequency of the given tag being selected and a tag selection frequency distribution over the plurality of user-generated tags for the predetermined period of time;
        retaining one or more tags from the plurality of user-generated tags where the corresponding z-score of the one or more tags is higher than a threshold determined based on random tag selection by the given user and the one or more users in the social network of the given user based on the tag selection frequency distribution;
        comparing the retained one or more tags of the given user with the retained one or more tags of the one or more users in the social network of the given user; and
        inferring the given user's interest based on the comparison of the retained one or more tags of the given user and the retained one or more tags of the one or more users in the social network of the given user.

11. The system of claim 10, wherein the processor further performs the step of sorting the plurality of user generated tags based on the plurality of user generated tags' corresponding z-score.

12. The system of claim 10, wherein threshold has an associated confidence value that is determined on the basis of a desired statistical confidence for inferring the given user's interests.

13. The system of claim 10, wherein the collecting step collects the plurality of user generated tags from one or more web-based content.

14. The system of claim 10, wherein the predetermined time period is a configurable parameter.

15. The system of claim 10, wherein the predetermined time period is a continuous time period.

16. The system of claim 10, wherein the predetermined time period is a non-continuous time period.

17. A system for inferring a user's interests from user generated tags, the system comprising:
    means for collecting a plurality of user-generated tags from a given user and one or more users in a social network of the given user over a predetermined period of time;
    means for calculating a corresponding z-score for each of the plurality of user-generated tags, where the corresponding z-score is a measure of a statistical significance for a given tag based on an observed frequency of the given tag being selected and a tag selection frequency distribution over the plurality of user-generated tags for the predetermined period of time;
    means for retaining one or more tags from the plurality of user-generated tags where the corresponding z-score of the one or more tags is higher than a threshold determined based on random tag selection by the given user and the one or more users in the social network of the given user based on the tag selection frequency distribution;
    means for comparing the retained one or more tags of the given user with the retained one or more tags of the one or more users in the social network of the given user;
    and means for inferring the given user's interest based on the comparison of the retained one or more tags of the given user and the retained one more tags of the one or more users in the social network of the given user.

18. The system of claim 17, further comprising means for sorting the plurality of user generated tags based on the plurality of user generated tags' corresponding z-score.

19. The system of claim 17, further comprising means for comparing tags from two or more users.

20. A program stored on non-transitory computer readable media for making a computer execute steps of:
- collecting a plurality of user-generated tags from a given user and one or more users in a social network of the given user over a predetermined period of time;
- calculating a corresponding z-score for each of the plurality of user-generated tags, where the corresponding z-score is a measure of a statistical significance for a given tag based on an observed frequency of the given tag being selected and a tag selection frequency distribution over the plurality of user-generated tags for the predetermined period of time;
- retaining one or more tags from the plurality of user-generated tags where the corresponding z-score of the one or more tags is higher than a threshold determined based on random tag selection by the given user and the one or more users in the social network of the given user based on the tag selection frequency distribution;
- comparing the retained one or more tags of the given user with the retained one or more tags of the one or more users in the social network of the given user; and
- inferring the given user's interest based on the comparison of the retained one or more tags of the given user and the retained one or more tags of the one or more users in the social network of the given user.

21. The program of claim 20, wherein the computer further executes the step of sorting the plurality of user generated tags based on the plurality of user generated tags' corresponding z-score.

22. The program of claim 20, wherein the threshold has an associated confidence value that is determined on the basis of a desired statistical confidence for inferring the given user's interests.

23. A non-transitory recording medium recording a program for making a computer execute steps of:
- collecting a plurality of user-generated tags from a given user and one or more users in a social network of the given user over a predetermined period of time;
- calculating a corresponding z-score for each of the plurality of user-generated tags, where the corresponding z-score is a measure of a statistical significance for a given tag based on an observed frequency of the given tag being selected and a tag selection frequency distribution over the plurality of user-generated tags for the predetermined period of time;
- retaining one or more tags from the plurality of user-generated tags where the corresponding z-score of the one or more tags is higher than a threshold determined based on random tag selection by the given user and the one or more users in the social network of the given user based on the tag selection frequency distribution;
- comparing the retained one or more tags of the given user with the retained one or more tags of the one or more users in the social network of the given user;
- and inferring the given user's interest based on the comparison of the retained one or more tags of the given user and the retained one or more tags of the one or more users in the social network of the given user.

24. The non-transitory recording medium of claim 23, wherein the computer further executes the step of sorting the plurality of user generated tags based on the plurality of user generated tags' corresponding z-score.

25. The non-transitory recording medium of claim 23, wherein the threshold has an associated confidence value that is determined on the basis of a desired statistical confidence for inferring the given user's interests.

* * * * *